United States Patent [19]

Davis et al.

[11] 3,787,289

[45] Jan. 22, 1974

[54] METHOD OF PRODUCING DEXTRANASE

[75] Inventors: Randall Scott Davis, La Habra; Don Lee Isenberg, Irvine, both of Calif.

[73] Assignee: Beckman Instruments, Inc., Fullerton, Calif.

[22] Filed: Aug. 30, 1971

[21] Appl. No.: 176,314

[52] U.S. Cl. .............................. 195/65, 195/66 R
[51] Int. Cl. ....................................... C12d 13/10
[58] Field of Search ............... 195/65, 66 R; 424/50

[56] References Cited
UNITED STATES PATENTS

| 3,627,643 | 12/1971 | Sipos et al. | 195/66 R |
| 3,590,121 | 6/1971 | Schiff et al. | 424/50 |

Primary Examiner—Lionel M. Shapiro
Attorney, Agent, or Firm—Robert J. Steinmeyer; Stanley M. Teigland

[57] ABSTRACT

The instant disclosure relates to a method of obtaining an extracellular endodextranase enzyme. The method involves inoculating into an aqueous nutrient medium containing dextran and an assimilable nitrogen source, thereby forming a culture, an aerobic bacterial strain which has the following characteristics:

gram reaction — positive
shape — rods
motility — positive
spores — sporulation difficult to demonstrate in nutrient agar but easier in growth limiting medium such as citrate, sporangia definitely swollen
agar colonies — round, opaque
glucose agar — positive for growth, acid from glucose using peptone as a source of nitrogen
growth factors — slight if any growth in minimal media
catalase — positive
lecithin — no hydrolytic zone formed
milk agar — positive zone of hydrolysis
starch — positive zone of hydrolysis
gelatine agar — positive zone of hydrolysis
glucose asparagine agar — scant growth
soybean agar — positive for growth
nutrient broth — uniform turbidity followed by clearing and formation of sediment
sodium chloride (NaCl) broth — after 2 days incubation, growth in 5% NaCl broth, no growth in 7% NaCl broth
nitrites — not produced from nitrates
citrate — not utilized
tyrosine agar — red-brown pigment after 2 days.

The culture is then incubated until extracellular endodextranase is elaborated therein. The bacteria are thereafter separated, thereby leaving a solution containing the extracellular endodextranase enzyme. The aerobic bacterial strains used in this method are also disclosed.

9 Claims, No Drawings

METHOD OF PRODUCING DEXTRANASE

BACKGROUND OF THE INVENTION

This invention relates to the production of dextranase, an enzyme capable of hydrolyzing dextran to small molecular weight substances, and aerobic bacterial strains useful in producing dextranase.

Dextranase has been used to hydrolyze dextran into smaller molecular weight compounds called "clinical dextrans," substances useful as blood extenders. Dextranase has also been used to produce oligosaccharides which are otherwise difficult to synthesize. The possible future uses of dextranase include the removal of dental plaque, a use presently under thorough investigation.

The above mentioned tasks are preferentially performed using an endodextranase (cleaving glucosidic linkages at random) rather than an exodextranase (cleaving glucosidic linkages one at a time from a terminal end). If the enzyme is extracellular, recovery and purification are simplified. In addition, if a culture does not produce an extracellular dextranase, but rather a cell bound or an intracellular dextranase, the levels of enzyme are usually low. Dextranase production by an aerobic microorganism in short time periods would simplify the fermentation process whereas anaerobic growth is usually slower and more costly.

Molds (Carlson, V.W., and Carlson, W.W., U.S. Pat. No. 2,716,084, Aug. 23, 1955; Carlson, V.W., and Carlson, W.W., U.S. Pat. No. 2,716,237, Aug. 23, 1955; Tsuchuja, H.M., et al., U.S. Pat. No. 2,742,399, Apr. 17, 1956) have been used to produce extracellular endodextranase but the growth period of molds is relatively long making the production costs high. Bacteria have also been found to produce dextranase under certain conditions. An aerobic bacterial strain, a Bacillus sp. (Zevenhuizen, L.P.T.M. 1968. Carbohyd. Res. 6: 310–318) investigated, produced a cell bound exodextranase. Other aerobes, Cytophaga (Janson, J.C., and Porath, J. 1966. Methods Enzymol. 8: 615–621) and *Cellvibrio fulva* (Ingelman, B. 1948. Acta Chem. Scand. 2: 803–812) produced endodextranases, but they were cell bound, and in the case of Cellvibrio the fermentation took several months. *Lactobacillus bifidus* (Bailey, R.W., and Clarke, R.T.J. 1959. Biochem. J. 72: 49–54; Bailey, R.W., et al. 1960. Nature 186: 553–554; Bailey, R.W., et al. 1961. Biochem. J. 80: 514–519; Bailey, R.W., and Robertson, A.M. 1962. Biochem. J. 82: 272–277; Clarke, R.T.J. 1959. J. Gen. Microbiol. 20: 549–553) produces extracellular endodextranase but the organism is anaerobic. Bacteroides (Hehre, E.J., and Sery, T.W. 1952. J. Bacteriol. 63: 424–426; Sery, T.W., and Hehre, E.J. 1956. J. Bacteriol. 71: 373–380) were used to produce both extracellular endo- and exo-dextranases but these organisms also require anaerobic growth conditions.

SUMMARY OF THE INVENTION

It is an object of the instant invention to provide an aerobic bacterial strain which has utilization in the production of high levels of extracellular endodextranase in a short time period. The combination of these characteristics advantageously makes the strain useful in an economical method for the production of endodextranase.

The instant invention relates to a method of obtaining an extracellular endodextranase enzyme. The method involves inoculating into an aqueous nutrient medium containing dextran and an assimilable nitrogen source, thereby forming a culture, an aerobic bacterial strain which has the following characteristics:
gram reaction — positive
shape — rods
motility — positive
spores — sporulation difficult to demonstrate in nutrient agar but easier in growth limiting medium such as citrate, sporangia definitely swollen
agar colonies — round, opaque
glucose agar — positive for growth, acid from glucose using peptone as a source of nitrogen
growth factors — slight if any growth in minimal media
catalase — positive
lecithin — no hydrolytic zone formed
milk agar — positive zone of hydrolysis
starch — positive zone of hydrolysis
gelatine agar — positive zone of hydrolysis
glucose asparagine agar — scant growth
soybean agar — positive for growth
nutrient broth — uniform turbidity followed by clearing and formation of sediment
sodium chloride (NaCl) broth — after 2 days incubation, growth in 5% NaCl broth, no growth in 7% NaCl broth
nitrites — not produced from nitrates
citrate — not utilized
tyrosine agar — red-brown pigment after 2 days.

The culture is then incubated until extracellular endodextranase is elaborated therein. The bacteria is thereafter separated, thereby leaving a solution containing the extracellular endodextranase enzyme which hydrolyzes dextran.

The instant invention also relates to an aerobic bacterial strain which has the following characteristics:
gram reaction — positive
shape — rods
motility — positive
spores — sporulation difficult to demonstrate in nutrient agar but easier in growth limiting medium such as citrate, sporangia definitely swollen
agar colonies — round, opaque
glucose agar — positive for growth, acid from glucose using peptone as a source of nitrogen
growth factors — slight if any growth in minimal media
catalase — positive
lecithin — no hydrolytic zone formed
milk agar — positive zone of hydrolysis
starch — positive zone of hydrolysis
gelatin agar — positive zone of hydrolysis
glucose asparagine agar — scant growth
soybean agar — positive for growth
nutrient broth — uniform turbidity followed by clearing and formation of sediment
sodium chloride (NaCl) broth — after 2 days incubation, growth in 5% NaCl broth, no growth in 7% NaCl broth
nitrites — not produced from nitrates
citrate — not utilized
tyrosine agar — red-brown pigment after 2 days.

Other objects and advantages of the instant invention will be apparent from the following detailed description.

DETAILED DESCRIPTION

The present invention utilizes aerobic bacteria to produce an extracellular endodextranase in short periods of time and at levels much higher than values reported for mold production. Numerous bacteria have been screened for their potential ability to produce dextranase. Over 600 bacterial cultures were isolated that would produce extracellular endodextranase under test cultural conditions. Of these, four organisms were selected which were found to produce high quantities of extracellular endodextranase when so cultivated.

Practically all of the 600 cultures isolated, including the four high producing strains belong to the genus Bacillus. These four microorganisms appear to differ from one another in the amount of extracellular endodextranase produced. These four organisms have been deposited and can be obtained from the permanent collection of the Northern Utilization Research and Development Division of the United States Department of Agriculture, Agricultural Research Service, 1815 North University Street, Peoria, Illinois 61604, with the following deposit numbers: NRRL B-3949, NRRL B-3976, NRRL B-3977, and NRRL B-3978. The four organisms demonstrate characteristics categorized similarly to those reported for *Bacillus coagulans* (Breed, R.S., et al., 1957. Bergey's Manual of Determinative Bacteriology. The Williams and Wilkins Company, Baltimore.). The characteristics of the four organisms appear in Table I below.

TABLE I

CHARACTERISTICS OF BACILLUS NRRL B-3949, NRRL B-3976,

NRRL B-3977, AND NRRL B-3978

Gram reaction: Positive
Shape: Rods
Motility: Positive
Spores: Sporulation difficult to demonstrate in nutrient agar; easier to demonstrate in growth limiting media such as citrate. Under these conditions sporangia definitely swollen.
Agar colonies: Round, opaque
Glucose agar: Positive for growth. Acid from glucose using peptone as a source of nitrogen.
Growth factors: Only slight if any growth in minimal media
Catalase: Positive
Lecithin: No hydrolytic zone formed
Milk agar: Positive zone of hydrolysis
Starch: Positive zone of hydrolysis
Gelatin agar: Positive zone of hydrolysis
Glucose asparagine agar: Only scant growth
Soybean agar: Positive for growth
Nutrient broth: Uniform turbidity followed by clearing and formation of sediment
Sodium Chloride
(NaCl) broth: After 2 days incubation, growth in 5% by weight NaCl broth but no growth in 7% by weight NaCl broth
Nitrites: Not produced from nitrates
Citrate: Not utilized
Tyrosine agar: Red-brown pigment after 2 days.

According to the instant invention, the bacteria are inoculated into an aqueous medium containing dextran plus an assimilable nitrogen source. If dextran is not incorporated into the medium, extracellular endodextranase production is very low or absent after incubation. Although inorganic sources of nitrogen may be used if supplemented with essential minerals and small amounts of growth factors, higher levels of enzyme are produced when an organic source of nitrogen is used. Corn steep liquor and autolyzed yeast extract were commonly used in the investigations of the present invention. The amounts of dextran and an assimilable nitrogen source can be varied over a wide range and extracellular endodextranase is still produced. However, it was found that the level of enzyme is usually high when dextran and the assimilable nitrogen source are approximately equal in concentration. Under pH controlled conditions it was found that a neutral pH is advantageous for high levels of enzyme production, although this neutral condition was not necessary for more modest levels of enzyme to be produced.

The enzyme produced in these cultures is extracellular, that is, it is present in the cultural medium after the bacteria are removed by centrifugation or filtration. The enzyme has been precipitated by salt or solvent fractionation and can be purified by conventional techniques.

The following specific examples illustrate the invention. All percentages are weight percentages and all incubations were at a temperature of about 32° C.

EXAMPLES 1-14

Bacillus NRRL B-3949 was examined for its ability to produce dextranase under various cultural conditions. The culture media specified in Table II was sterilized by autoclaving and inoculated with a 5 percent inoculum of the organism. The initial pH of the fermentation was 7.0. After being shaken for the time indicated in the Table, samples were removed and assayed for the presence of extracellular endodextranase. The assay consisted of incubating the enzyme plus dextran and measuring the amount of reducing sugars produced. Assays were performed at pH 6.0 at 40° C. The units used are those defined by Tsuchiya, H.M., et al., U.S. Pat. No. 2,742,399, Apr. 17, 1956.

TABLE II

| | Media | | Units/ml Organism NRRL B-3949 | | |
|---|---|---|---|---|---|
| Ex. No. | % Autolyzed Yeast Extract | % Dextran | 18 Hr. | 29 Hr. | 41 Hr. |
| 1 | 4 | 0 | <50 | <50 | <50 |
| 2 | 0.5 | 0.25 | 90 | 135 | 180 |
| 3 | 0.5 | 0.5 | 180 | 390 | 405 |
| 4 | 1 | 1 | 480 | 900 | 1200 |
| 5 | 2 | 1 | 300 | 300 | 300 |
| 6 | 3 | 1 | 300 | 300 | 420 |
| 7 | 4 | 1 | 300 | 300 | 300 |
| 8 | 3 | 2 | 720 | 600 | 900 |
| 9 | 4 | 2 | 300 | 600 | 600 |
| 10 | 5 | 2 | 120 | 300 | 420 |
| 11 | 3 | 3 | 300 | 600 | 1200 |
| 12 | 6 | 3 | <50 | <50 | <50 |
| 13 | 4 | 4 | 180 | 600 | 1500 |
| 14 | 5 | 4 | <50 | 180 | 200 |

EXAMPLES 15–28

Bacillus NRRL B-3976 was examined for its ability to produce extracellular endodextranase under various cultural conditions. This culture was grown and its extracellular endodextranase activity assayed as described for Bacillus NRRL B-3949 in the previous examples.

TABLE III

| | Media | | Units/ml Organism NRRL B-3976 | | |
|---|---|---|---|---|---|
| Ex. No. | % Autolyzed Yeast Extract | % Dextran | 18 Hr. | 29 Hr. | 41 Hr. |
| 15 | 4 | 0 | <50 | <50 | <50 |
| 16 | 0.5 | 0.25 | 60 | 150 | 180 |
| 17 | 0.5 | 0.5 | 120 | 330 | 360 |
| 18 | 1 | 1 | 600 | 900 | 900 |
| 19 | 2 | 1 | 300 | 300 | 300 |
| 20 | 3 | 1 | 300 | 300 | 300 |
| 21 | 4 | 1 | 300 | 300 | 480 |
| 22 | 3 | 2 | 420 | 600 | 600 |
| 23 | 4 | 2 | 360 | 600 | 900 |
| 24 | 5 | 2 | 120 | 300 | 720 |
| 25 | 3 | 3 | 420 | 900 | 1500 |
| 26 | 6 | 3 | <50 | <50 | <50 |
| 27 | 4 | 4 | 300 | 900 | 1500 |
| 28 | 5 | 4 | <50 | <50 | <50 |

EXAMPLES 29–42

Bacillus NRRL B-3977 was examined for its ability to produce extracellular endodextranase under various cultural conditions. Growth and assay conditions are identical to those described for Bacillus NRRL B-3949 in Examples 1–14.

TABLE IV

| | Media | | Units/ml Organism NRRL B-3977 | | |
|---|---|---|---|---|---|
| Ex. No. | % Autolyzed Yeast Extract | % Dextran | 18 Hr. | 29 Hr. | 41 Hr. |
| 29 | 4 | 0 | <50 | <50 | <50 |
| 30 | 0.5 | 0.25 | 75 | 150 | 180 |
| 31 | 0.5 | 0.5 | 150 | 360 | 360 |
| 32 | 1 | 1 | 900 | 1200 | 1200 |
| 33 | 2 | 1 | 240 | 300 | 300 |
| 34 | 3 | 1 | 240 | 300 | 300 |
| 35 | 4 | 1 | 180 | 180 | 300 |
| 36 | 3 | 2 | 300 | 600 | 600 |
| 37 | 4 | 2 | 120 | 300 | 600 |
| 38 | 5 | 2 | 60 | 120 | 480 |
| 39 | 3 | 3 | 360 | 720 | 900 |
| 40 | 6 | 3 | <50 | <50 | <50 |
| 41 | 4 | 4 | 120 | 600 | 1200 |
| 42 | 5 | 4 | <50 | 120 | 130 |

EXAMPLES 43–56

Bacillus NRRL B-3978 was examined for its ability to produce extracellular endodextranase under various cultural conditions. Growth and assay conditions are identical to those described for Bacillus NRRL B-3949 in Examples 1–14.

TABLE V

| | Media | | Units/ml Organism NRRL B-3978 | | |
|---|---|---|---|---|---|
| Ex. No. | % Autolyzed Yeast Extract | % Dextran | 18 Hr. | 29 Hr. | 41 Hr. |
| 43 | 4 | 0 | <50 | <50 | <50 |
| 44 | 0.5 | 0.25 | 60 | 180 | 180 |
| 45 | 0.5 | 0.5 | 150 | 300 | 330 |
| 46 | 1 | 1 | 600 | 720 | 900 |
| 47 | 2 | 1 | 300 | 300 | 480 |
| 48 | 3 | 1 | 300 | 300 | 480 |
| 49 | 4 | 1 | 300 | 300 | 420 |
| 50 | 3 | 2 | 360 | 480 | 600 |
| 51 | 4 | 2 | 300 | 600 | 900 |
| 52 | 5 | 2 | 120 | 600 | 900 |
| 53 | 3 | 3 | 180 | 600 | 900 |
| 54 | 6 | 3 | <50 | <50 | <50 |
| 55 | 4 | 4 | 180 | 600 | 1200 |
| 56 | 5 | 4 | <50 | 120 | 140 |

It will be appreciated the foregoing description is for illustrative purposes only and the instant invention is not to be limited thereby but only by the claims wherein what is claimed is:

1. The method of obtaining an extracellular endodextranase enzyme which comprises:
   a. inoculating into an aqueous nutrient medium containing dextran and an assimilable nitrogen source, thereby forming a culture, an aerobic bacterial strain selected from the group consisting of NRRL B-3949, NRRL B-3976, NRRL B-3977, and NRRL B-3978;
   b. incubating the culture until extracellular endodextranase is elaborated therein; and
   c. thereafter separating the bacteria thereby leaving a solution containing the extracellular endodextranase enzyme.

2. The method of claim 1 wherein the bacterial strain is NRRL B-3949.
3. The method of claim 1 wherein the bacterial strain is NRRL B-3976.
4. The method of claim 1 wherein the bacterial strain is NRRL B-3977.
5. The method of claim 1 wherein the bacterial strain is NRRL B-3978.
6. The method of claim 1 wherein the amount of dextran in the nutrient medium is from about 0.25 percent to about 5 percent by weight.
7. The method of claim 1 wherein the amount of assimilable nitrogen source present is from about 0.5 percent to about 5 percent by weight.
8. The method of claim 1 wherein the assimilable nitrogen source is autolyzed yeast extract.
9. The method of claim 1 wherein the dextran and assimilable nitrogen source are present in approximately equal concentrations.

* * * * *